3,215,601
ANTACID COMPOSITION AND METHOD
OF MAKING SAME
Morris E. Stolar, Parsippany, N.J., assignor to Warner-Lambert Pharmaceutical Company, Morris Plains, N.J., a corporation of Delaware
Filed Feb. 7, 1963, Ser. No. 256,847
3 Claims. (Cl. 167—55)

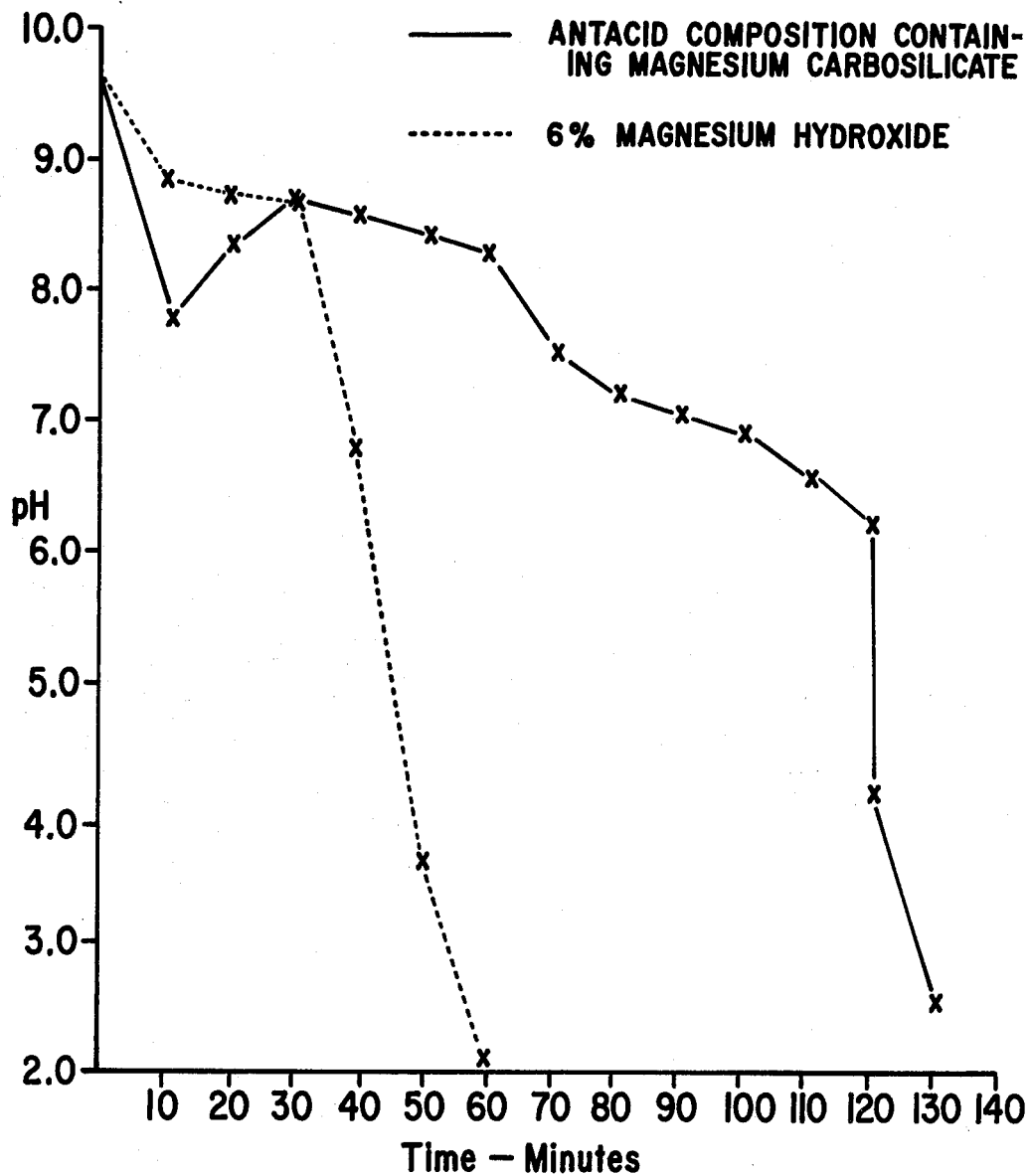

This invention relates to a novel magnesium carbosilicate which is useful as a gastric antacid and relates to a process for the production of this novel compound. The present invention also includes within its scope antacid compositions containing said novel magnesium carbosilicate.

Gastric antacids are therapeutic agents for oral administration which lower the acidity of the gastric contents. They are primarily used in the treatment of hyperchlorhydria and peptic ulcer. Generally, they can be classified into systemic and nonsystemic antacids. A systemic antacid such as sodium bicarbonate is one that is soluble, readily absorbed and capable of changing the pH by neutralizing hydrochloric acid. While effective in many respects, systemic antacids are prone to produce alkalosis by disturbing the acid-base balance of body fluids. The nonsystemic antacids, on the other hand, are compounds which are not absorbed but which exert their action chiefly by their ability to coat the stomach mucosa, thus acting as a protective barrier against acidic irritation. Magnesium oxide, for example, is such a nonsystemic antacid. The nonsystemic antacids have the drawback that their protective effect cannot be sustained. It is apparent that an antacid which not only has effective acid neutralizing capacity but which also has the ability to form a sustained protective layer over the stomach mucosa would fill a long-felt need.

It is, therefore, a primary object of this invention to provide a novel antacid compound which has effective acid-neutralizing capacity coupled with sustained protective action.

A further object of this invention is to provide useful compositions containing said antacid compound.

Other objects and the advantages of this invention will become apparent from the following detailed description.

It has now been found that the novel magnesium carbosilicate of the formula $Mg SiO_2 \cdot CaCO_3$ is not only remarkably effective as a nonsystemic antacid but in addition is capable of neutralizing the acidity of the gastric contents while at the same time forming a sustained protective coat over the mucosa.

The magnesium carbosilicate of the present invention is prepared by the steps which consist first of adding sodium silicate to an aqueous solution of sodium carbonate and then adding the resulting solution with stirring to a suspension of magnesium hydroxide until a smooth slurry is obtained. Separate aqueous solutions of magnesium chloride and calcium chloride are then gradually added to the slurry and mixing is continued until a precipitate of the desired magnesium carbosilicate is obtained.

It is generally preferred that the chloride solutions be added in small portions or increments with the addition being accompanied by strong agitation of the reaction mixture thus formed. The temperature at which the reaction is carried out may conveniently be maintained at about room temperature. The reaction mixture is then continuously agitated for about 30 minutes after the addition of the chlorides has been completed.

The precipitate which is thus formed by this reaction constitutes the magnesium carbosilicate of this invention. The precipitate is filtered off and strained through fabric bags or other suitable means in order to remove a large proportion of the water and is then washed several times with water to remove any soluble salts.

The exact structure of this magnesium carbosilicate is not fully known but it corresponds to the empirical formula $Mg SiO_2 \cdot CaCO_3$. When dried it forms a white fluffy powder having a somewhat alkaline taste. On testing its acid combining power it is found that 1 gram will neutralize about 206 ml. of 0.1 N HCl. The magnesium carbosilicate of this invention can be employed as an antacid either in a wet state after washing or in its dry form. It may be suspended in water and may be combined with other antacids. Chitosan aluminate, for example, may be added to it to form a combined antacid product having from about 1 to about 25 percent by weight of chitosan aluminate. Other suitable antacids are, for example, aluminum hydroxide, magnesium hydroxide, calcium phosphate, and the like.

A suitable liquid antacid, for example, may contain the novel magnesium carbosilicate and chitosan aluminate with water as the carrier and optionally containing flavoring agents such as saccharin and sorbitol together with suspending and dispersing agents such as "Methocel" and preservatives such as methyl and propyl parabens, and the like.

Alternatively, the dried precipitate may be compressed into tablet form following conventional tableting procedures employing suitable lubricants and other conventional diluents with each tablet containing from about 100 to 1000 mg. of said magnesium carbosilicate.

For the treatment of gastric hyperacidity a daily dose of 0.1 to 1 gram of magnesium carbosilicate in several divided doses is generally administered.

The following examples are given in order further to illustrate this invention.

Example 1

The magnesium carbosilicate of this invention is formed by reacting the following ingredients in the sequence and manner hereinafter described:

| | |
|---|---|
| Sodium silicate (as a solution of 1 part dissolved in 1.45 parts of 1 N sodium hydroxide), gm. | 224.300 |
| Sodium carbonate, anhydrous, gm. | 644.660 |
| Magnesium chloride hexahydrate, gm. | 1007.635 |
| Calcium chloride, anhydrous, gm. | 675.089 |
| Magnesium hydroxide (30% magma), gm. | 869.400 |
| Water, ml. | 2,700 |

The sodium carbonate is dissolved in about 1738 ml. of water and the sodium silicate solution added. The resulting solution is then introduced into a conventional mixer containing the magnesium hydroxide magma and the mixture formed is then stirred until a homogenous suspension results. The magnesium chloride and the calcium chloride are dissolved in 326 ml. and 587 ml. of water respectively and these aqueous chloride solutions are then added in small portions to the suspension with constant mixing. After continued and thorough mixing for about 30 minutes the reaction mixture is filtered off and the solid residue washed with water. The magnesium carbosilicate thus formed is obtained as a white precipitate.

Example 2

An antacid composition for oral administration is prepared from the following components:

| Ingredients: | Parts by weight |
|---|---|
| Chitosan aluminate | 16.25 |
| Magnesium carbosilicate (Example 1) | 230.00 |
| Peppermint oil | 0.1 |
| Saccharin, soluble | 0.15 |
| Methylparaben | 0.37 |
| Propylparaben | 0.07 |
| Water to make | 1,000 |

The methyl and propyl parabens are dissolved in about 500 ml. of water with the aid of heat and the saccharin added. The solution formed is then introduced into a conventional mixer containing the chitosan aluminate, magnesium carbosilicate and the peppermint oil. This mixture is then stirred until a homogenous suspension is formed. Sufficient water is then added to make 1000 parts by weight.

The specific acid titration curve for the above composition is measured in accordance with the Holbert method, J. Am. Pharm. Assn., Scientific Edition, vol. 36, page 149 (1947) and is illustrated in the drawing by the solid line curve. Briefly, the procedure is as follows:

Into a beaker fitted with a stirring device containing about 1000 ml. of water is charged 150 ml. of simulated gastric juice, U.S.P. XVI. The mixture is then mixed, warmed to 37° to 38° C. and maintained at that temperature during the test. To this is added with stirring 5 ml. of the above antacid composition. When the addition of the antacid is complete the pH is determined. The mixture is allowed to stir for 10 minutes after which the pH is again determined. 20 ml. of the mixture is then withdrawn and replaced by 20 ml. of fresh simulated gastric juice. This procedure is repeated at 10 minute intervals for 130 minutes. The curve is obtained by plotting time in minutes against pH. The specific acid titration curve is also obtained employing analogous conditions for a 5 ml. dose of a 6% aqueous suspension of magnesium hydroxide and is illustrated by the broken line curve in the drawing. As it is evident from the curves that the antacid composition of this invention has a sustained acid combining capacity by maintaining the pH of the medium at about 7 for a period of about 120 minutes while the acid combining capacity of a standard antacid such as magnesium hydroxide is rapidly lost in about 50 minutes. The comparison illustrates very dramatically the outstanding antacid properties of the above compositions.

It is understood that the foregoing detailed description is given merely by way of illustration and that many variations may be made therein without departing from the spirit of my invention.

Having described my invention, what I desire to secure by Letters Patent is:

1. Process for the production of magnesium carbosilicate which comprises,
    (a) adding sodium silicate to an aqueous solution of sodium carbonate,
    (b) adding the resulting solution of (a) with stirring to a suspension of magnesium hydroxide until a smooth slurry is obtained, and
    (c) adding separate aqueous solutions of magnesium chloride and calcium chloride to the slurry of (b) with mixing until a precipitate of magnesium carbosilicate is obtained.

2. The product prepared by the process of claim 1.

3. A liquid antacid composition which comprises the product prepared by the process of claim 1 suspended in water.

References Cited by the Examiner

UNITED STATES PATENTS

| | | | |
|---|---|---|---|
| 2,173,085 | 9/39 | Cummins | 23—110 |
| 2,554,072 | 5/51 | Sullivan | 167—55 |
| 2,550,489 | 4/51 | Martin | 167—55 |
| 2,783,124 | 2/57 | Grote | 23—14 |
| 3,099,524 | 7/63 | Grossmith | 23—14 |

JULIAN S. LEVITT, *Primary Examiner.*

FRANK CACCIAPAGLIA, JR., *Examiner.*